United States Patent [19]

Addeo et al.

[11] Patent Number: 4,948,820

[45] Date of Patent: Aug. 14, 1990

[54] THERMODEGRADABLE COMPOSITIONS BASED ON CRYSTALLINE HOMO- OR COPOLYMERS OF PROPYLENE AND PROCESS FOR CARRYING OUT THE SELECTIVE DEGRADATION OF SUCH HOMO- AND COPOLYMERS

[75] Inventors: Antonio Addeo, Nola; Annibale Vezzoli, Carugo; Stefano Saccardi; Corrado Brichta, both of Milan, all of Italy

[73] Assignee: Montedipe S.p.A., Milan, Italy

[21] Appl. No.: 302,191

[22] Filed: Jan. 27, 1989

[30] Foreign Application Priority Data

Jan. 28, 1988 [IT] Italy ................................ 19233 A/88

[51] Int. Cl.$^5$ .......................... C08K 5/54; C08F 8/50
[52] U.S. Cl. .................................. 523/124; 523/125; 524/265; 525/938
[58] Field of Search ................ 556/443, 464; 523/125, 523/124; 525/938, 342, 359.6; 524/265, 269; 526/914, 206, 237; 522/77, 129

[56] References Cited

U.S. PATENT DOCUMENTS

| | | | |
|---|---|---|---|
| 3,144,436 | 8/1964 | Greene et al. | 525/333.8 |
| 3,378,533 | 4/1968 | Schnell et al. | 525/206 |
| 3,792,126 | 2/1974 | Vio | 556/443 |
| 3,931,355 | 1/1976 | Rudolph et al. | 556/443 |
| 4,145,507 | 3/1979 | Wolfer's et al. | 556/443 |
| 4,360,606 | 11/1982 | Tobias et al. | 523/125 |
| 4,430,504 | 2/1984 | Reuter et al. | 526/194 |
| 4,535,174 | 8/1985 | Crivello | 556/443 |
| 4,556,695 | 12/1985 | Ijntema | 525/206 |
| 4,675,426 | 6/1987 | Crivello | 556/464 |

*Primary Examiner*—Veronica P. Hoke
*Attorney, Agent, or Firm*—Stevens, Davis, Miller & Mosher

[57] ABSTRACT

Selective thermodegradation of homo- and copolymers of propylene, without encountering thermo-oxidation phenomena, by treating the polymer at 250°–350° C. in the presence of primary and/or secondary antioxidant and of a derivative of benzopinacol having formula (I):

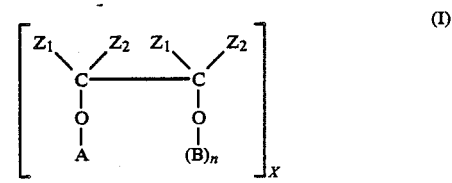

wherein $n=1$, or $=0$, and
when $n=1$, X may be $=1$, and in this case $Z_1$ and $Z_2$ form together with each other

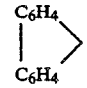

groups,

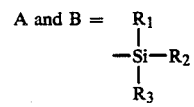

wherein $R_1$, $R_2$, $R_3$, which may be the same or different, are alkyl or aryl radicals;
or X ranges from 3 to 20 and in this case $Z_1$ and $Z_2$ are aryl radicals, A and B are $R_1$-Si-$R_2$ groups that are part of an oligomer having formula:

(Abstract continued on next page.)

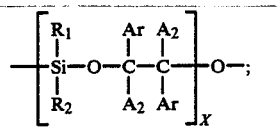
and when n=0, X is=1, $Z_1$ and $Z_2$ are aryl radicals, and
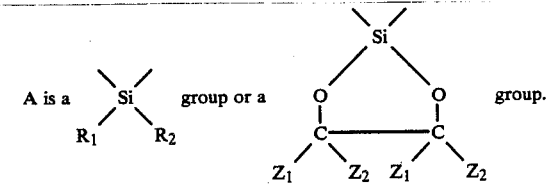
17 Claims, 1 Drawing Sheet

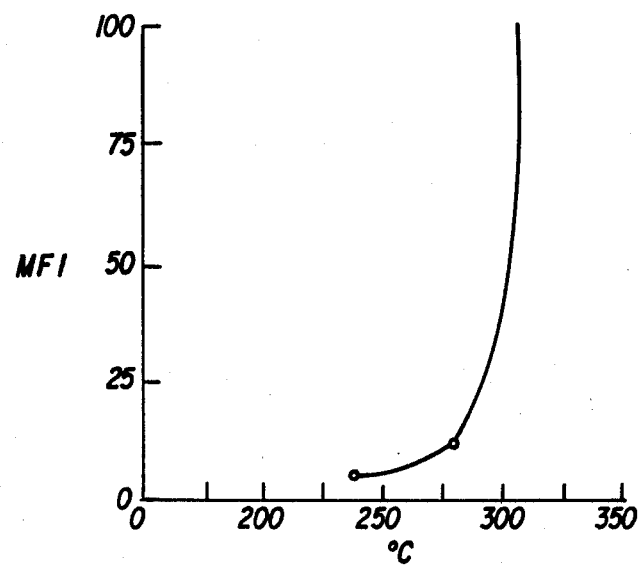

THERMODEGRADABLE COMPOSITIONS BASED ON CRYSTALLINE HOMO- OR COPOLYMERS OF PROPYLENE AND PROCESS FOR CARRYING OUT THE SELECTIVE DEGRADATION OF SUCH HOMO- AND COPOLYMERS

DESCRIPTION OF THE INVENTION

The present invention relates to new thermodegradable compositions of homo- or copolymers of propylene.

Moreover, it relates to a process for carrying out the selective degradation of crystalline homo- or copolymers of propylene, in order to obtain polymers endowed with a narrower distribution of molecular weights, suitable for injection molding and production of fibers and films.

According to U.S. Pat. No. 3,144,436 a process is known concerning the degradation of molten crystalline polypropylene, which degradation is carried out practically in the absence of oxygen, in a screw extruder at a temperature 100 Centigrade degrees above the melting point of the polymer and in the presence of an initiator of free radicals, and by operating in such a way that the amount of oxygen introduced into the polymer is below 0.2 p.h.r. The degradation thus obtained allows an increase in "Melt Flow Index" and therefore a lowering in the polymer viscosity.

The use of initiators consisting of organic peroxides, as cited in the above-mentioned patent, gives rise, however, to a concomitant thermo-oxidative degradation, which does not allow control of the process in order to obtain reproduceable results.

Moreover, the residues of the decomposition of the peroxides are generally volatile and cause a disagreeable odor.

Moreover, it is known to carry out the degradation of the crystalline homopolymers and copolymers of propylene by using derivatives of 1,2-diphenylethane as initiator of radicals. In Japanese patent application No. J5 4090-291 the use is disclosed, for this purpose, of brominated and alkyl derivatives of such compounds. However, also by operating in such a way, the thermo-oxidative degradation of the polymer at the required high temperatures cannot be avoided, and moreover, residues of the initiator are always present in the degraded polymer, which residues consist of undesirable volatile or brominated compounds. In particular, the brominated residues do not allow one to produce articles suitable for contact with foodstuffs.

The same drawbacks are also found by operating according to U.S. Pat. No. 4,556,695 claiming the use of chlorinated derivatives of 1,2-diphenylethane.

In accordance with the present invention, it has been discovered that the selective degradation of homo- and copolymers of propylene may be carried out, operating in the presence of oxygen as well, without encountering the drawback of thermo-oxidative degradation of the polymer, if the heating of the polymer is carried out between 250° and 350° C. in the 350° C. in the presence of primary and secondary antioxidants and of cyclic or alicyclic derivatives of benzopinacol falling within formula (I):

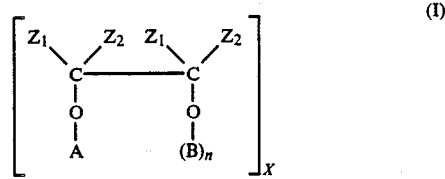

wherein n may be 1 or 0, and, when n=1, X may be 1 and in this case:

$Z_1$ and $Z_2$ form together with each other a

group (fluorenone),
A and B are

groups, wherein $R_1$, $R_2$, $R_3$, which may be the same different, may be $C_1$-$C_4$ alkyl radicals or $C_6$-$C_{12}$ aryl radicals;

or X may range from 3 to 20 and in this case:

$Z_1$ and $Z_2$ are aryl radicals, which may be the same or different;

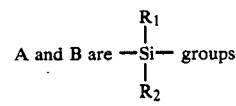

being part of an oligomer of the product having the formula (I), consisting at least of 3 and up to 20 repeating units having the formula (II):

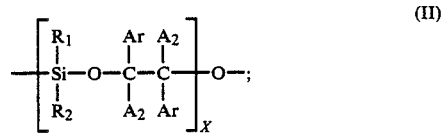

wherein Ar is an aryl radical and $R_1$ and $R_2$ have the meanings as defined hereinbefore;

when, on the contrary, n=0, X is=1, $Z_1$ and $Z_2$ are aryl radicals, which may be the same or different, A=a group having formula

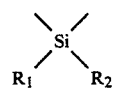

or a group having formula

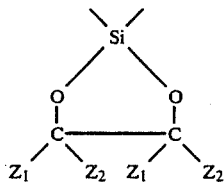

wherein every silicon link is bound to an oxygen atom of group

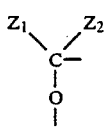

and $R_1$ and $R_2$ have the meaning as defined above.

The above-reported products of formula (I) are known. They may be obtained according to the methods of preparation described, for instance, in Polymer Bulletin, 16,95–102 (1986), Springer Ed., and in J. P. Sci.: Part A: Polymer Chemistry, Vol. 24, 1197–1215 (1986).

Products comprised in formula (I), falling within the objects of the present invention are, for instance, when $n=1$:

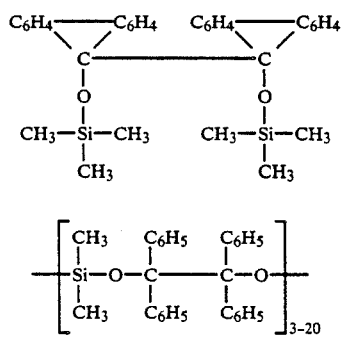

when $n=0$

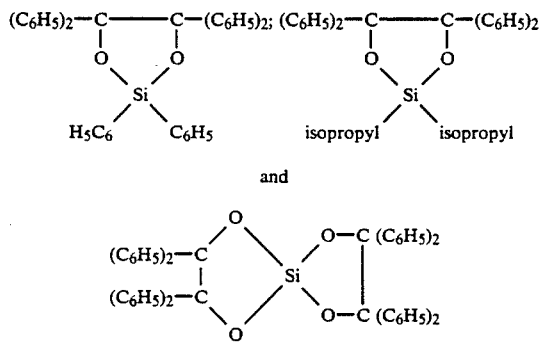

Therefore an object of the present invention consists in providing thermodegradable compositions of homo- and copolymers of propylene, comprising at least one derivative of benzopinacol falling within formula (I) as illustrated hereinbefore and at least one primary and/or secondary antioxidizing agent.

A further object of the present invention consists in a process for carrying out the degradation of crystalline homo- or copolymers of propylene consisting essentially in heating such homo- or copolymers at a temperature ranging from 250° to 350° C., in the presence of at least one derivative of benzopinacol falling within formula (I) as illustrated hereinbefore, as well as of at least one or more primary and/or secondary antioxidizing agents.

The homo- and copolymers of propylene, to which the compositions and the process of the present invention refer, are stereoregular polymers obtained by means of catalysts of Ziegler-Natta type, including besides polypropylene consisting essentially of isotactic macromolecules, copolymers of propylene with ethylene containing predominantly propylene, of statistic or block type, and copolymers of propylene with alpha-olefins of the formula $CH_2=CH-R$, wherein R is an alkyl radical having from 2 to 6 carbon atoms, and in particular 1-butene and 1-hexene.

The polymer or copolymer of propylene present in the degradable compositions of the present invention may have values of MFI over a wide range, generally between 0.2 and 100, but preferably between 0.2–0.5 and up to 50.

Use may be made, as antioxidizing agents, of any of the customary primary and secondary antioxidizing agents suitable for avoiding the degradation of the polymeric macromolecules due to secondary reactions of auto-oxidation. In particular, the sterically hindered phenols may be cited, preferably (2-6)-di-t.butyl-4-methylphenol (BHT), secondary aromatic amines, thioethers, phosphites, phosphonites, zinc dithiobutylcarbamate, and mixtures thereof.

Moreover use may be made, with advantage, of synergistic combinations of BHT with 2-2'-thio-diethyl-bis-3-(3,5-di-tert.butyl-4-hydroxyphenyl)-propionate and/or with phosphites and phosphonites, and in particular tetrakis-(2,4-di-tert.-butyl-phenyl)-4,4'-diphenylenediphosphonite.

The amounts of the benzopinacol derivatives, falling within the above formula (I), to be used in the compositions and process of the present invention may vary over wide ranges, according to the reduction in the molecular weight one wishes to obtain. They generally range from 0.01 to 3% by weight referred to the polymer. Preferably the amount ranges from 0.1 to 1% by weight.

The antioxidizers required according to the invention may be present in total amounts not over 2% by weight, and preferably from 0.01 to 1% by weight, referred to the polymer.

In addition to such compounds, use may be also made of light stabilizers comprising, for instance, 2(2'-hydroxyphenyl)benzotriazoles, 2-hydroxy-4-alkoxybenzophenones, sterically hindered amines, and the like. Other additives suitable for improving the rheologic properties of the products may also be used with advantage for the process of degradation, for instance nucleating agents.

The preferred temperatures for the degradation, according to the present invention, range from 270° to 330° C.

The degradation reaction may be carried out by heating at the above-mentioned temperatures for a period of time ranging generally from 0.1 to 20 minutes, and preferably from 0.5 to 10 minutes, by operating in a conventional closed mixer (for instance of the Banbury type) or, preferably, in a screw extruder.

Afterwards the polymer thus degraded may be granulated.

The benzopinacol derivative, after having been dissolved in a suitable organic solvent, may be added directly to the (co)polymer in powder form, or it may be introduced, in the form of a concentrated master batch of polymer, directly into the extruder together with the (co)polymer to be degraded.

According to one embodiment of the present invention the derivatives of benzopinacol, as well as the antioxidizers, are added previously in the stage of synthesis of the (co)polymer during the liquid phase polymerization of the monomers. Afterwards the (co)polymers thus obtained are subjected to the degradation reaction, as described above.

The polymer degradation is characterized by an increase in its Melt Flow Index, determined according to ASTM D-1238-73 rule, L condition, and a corresponding lowering of its intrinsic viscosity.

The following examples are now given in order still better to illustrate the invention, but without limiting its scope.

EXAMPLE 1 (REFERENCE)

500 parts by weight of crystalline polypropylene in powder form, having an apparent density 0.50 g/cm$^3$, Melt Flow Index=12 (according to ASTM - 1233 - 73, L condition), produced by Himont Italy Company (tradename Moplen FL-F20) were mixed uniformly in a Banbury mixer at room temperature with 5 parts by weight of BHT antioxidizers (tradename Tepal) produced by ICI Company, with 5 parts by weight of phenolic antioxidizer containing sulphur (tradename Irganox 1035 produced by Ciba Geigy Company) and furthermore with 5 parts by weight of calcium stearate. Afterwards the composition thus obtained was subjected to heating at 290° C., keeping up always a good stirring.

A sample was withdrawn every 2 minutes for a total period of time of 10 minutes, and after cooling to room temperature, the determinations were carried out of the MFI and intrinsic viscosity [η] 130° C. tetralin.

From the values shown in Table 1 below, no substantial change is observed which would show a polymer degradation.

EXAMPLE 2

43 parts by weight of a silylpinacolone ether, an oligomer of the monomer having the formula:

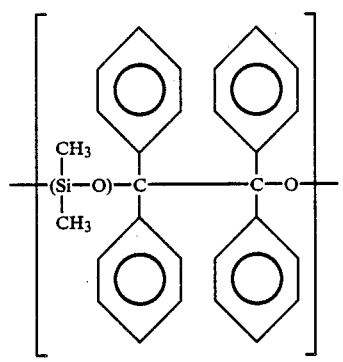

(Initiator ZF - WFH - 5090, produced by Bayer G.m.b.H. Company) were added to the composition described in Reference Example 1.

The mixture thus obtained was subjected to heating at 280° C., afterwards proceeding according to Example 1.

Table 1 shows that the MFI values of the polymer thus treated, according the invention, increase so remarkably that values over 100 are achieved, whereas the corresponding values of the intrinsic viscosity fall off remarkably.

TABLE 1

| Mixing time (minutes) | M.F.I. (230° C.-2,169 kg) | | 130° C. [η] tetrain (ml/g) | |
|---|---|---|---|---|
| | Ex. 1 (reference) | Ex. 2 | Ex. 1 (reference) | Ex. 2 |
| 0 | 12 | 12 | 134.5 | 134.5 |
| 2 | 14 | 15 | 128.7 | 126.2 |
| 4 | 14.5 | 35.3 | 126.2 | 97.8 |
| 6 | 15.2 | 67.5 | 125.7 | 82.1 |
| 8 | 15.8 | 95 | 124.3 | 74.5 |
| 10 | 17.5 | 102.7 | 120.7 | 72.8 |

EXAMPLE 3

100 parts by weight of crystalline polypropylene Moplen FL-F20 were subjected to mixing for a period of time of half a minute in a turbomixer of the Henschel type with 0.1 part by weight of BHT, 0.1 part by weight of antioxidizer Irganox 1035, and 0.1 part by weight of calcium stearate. Finally, one added 0.6 p.h.r. of bis (trimethylsilyl) fluorenone pinacolate having the formula:

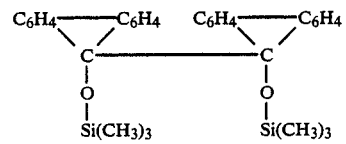

obtained according to procedure B described by J. V. Crivello et al. in Journal of Polymer Science: Part A Polymer Chemistry, Vol. 24 (1986), page 1200.

Then the mixture was fed into the feedbox of a Werner-Pfleiderer double-screw extruder, type 2D5 K28, whose screws had a diameter of 28 mm. One operated with a flow of the mixture of 3 Kg/h, residence time of 100 seconds, and 100 rpm of the screws. As the data of Table 2 below show, the MFI increases remarkably as a function of the temperature of the molten mass.

TABLE 2

| Temperature of the molten mass °C. | M.F.I. of the extruded material (g/10 min.) |
|---|---|
| 240 | 6 |
| 280 | 11 |
| 300 | 40 |
| 310 | >100 |

In the attached FIGURE the overall trend is reported of the M.F.I. values within the temperature range from 240° to 310° C., by operating under the conditions described herein.

EXAMPLE 4

A mixture consisting, by weight, of 100 parts of an ethylene-propylene block copolymer (MFI=2.4 g/10 min.; content by weight of ethylene=14.1%), 3 parts by weight of talc (fine powder whose particles have a diameter of about 1 μm), of 0.1 part of antioxidant BHT, 0.1 part of Irganox 1035, and 0.6 part of cyclic silyl-pinacolone ether having the following formula:

$$(C_6H_5)_2-C-C-(C_6H_5)_2$$
$$\diagdown O \quad O \diagup$$
$$\diagdown Si \diagup$$
$$\diagup \quad \diagdown$$
$$C_6H_5 \quad C_6H_5$$

obtained according to the method described by J. V. Crivello et al. in Polymer Bulletin 16, pages 95–102 (1986), was fed into a Werner-Pfleiderer double screw extruder of the same type as indicated in Example 3, at an operating temperature ranging from 240° to 310° C.

The specimens obtained from the mix thus treated were subjected to the characterization of flexural modulus and impact strength.

They presented a flexural modulus of 14000 Kg/cm$^2$ and an impact strength of 105 Kg-cm at 40° C., whereas the specimens obtained without the use of cyclic silyl-pinacolone ether had an impact strength of only 4.5 Kg-cm, although they presented a modulus of elasticity of 14500 Kg/cm$^2$.

EXAMPLE 5

0.3 atmosphere of hydrogen, 500 g of propylene, and 2.1 millimoles of Al $(C_2H_5)_3$ together with 0.7 millimoles of ethyl benzoate and 20 mg of solid catalyst, suspended in 30 ml of n-heptane and prepared according to Japanese patent application No. 77-151,091, were introduced into a 3 liter stainless steel autoclave.

Finally one added 1.8 g of spirocyclic silyl-ortho ester (m.p. 240° C.) having the following chemical formula:

$$(C_6H_5)_2-C-O \quad O-C-(C_6H_5)_2$$
$$| \quad \diagdown Si \diagup \quad |$$
$$(C_6H_5)_2-C-O \quad O-C-(C_6H_5)_2$$

and prepared according to the method described by J. V. Crivello et al. in Polymer Bulletin 16, page 98 (1986).

After having been polymerized at 60° C. for 4 hours, the residual monomer was removed by evaporation, thereby recovering 300 g of polymer, which turned out to be insoluble in boiling n-heptane for 94% and presented an intrinsic viscosity at [η] 130° C. tetralin of 136 ml/g and MFI=5.6 (according to ASTM D=1231, L condition).

100 parts by weight of the crystalline polymer containing the above-mentioned spirocyclic ether, were subjected to mixing in a turbomixer of the Henschel type with 0.1 part by weight of BHT, 0.1 part by weight of antioxidant Irganox 1035, and 0.1 part by weight of Ca-stearate.

Then the composition thus obtained was extruded under the same conditions of Example 3.

After extrusion one noted an increase to 53 in the MFI value, whereas the intrinsic viscosity fell off to 88.6 ml/g.

What is claimed is:
1. Thermodegradable compositions based on crystalline homo- or copolymers of propylene comprising at least one primary and/or secondary antioxidant agent and at least one compound which is a derivative of benzopinacol having formula:

$$\left[ \begin{array}{cc} Z_1 \diagdown \quad \diagup Z_2 & Z_1 \diagdown \quad \diagup Z_2 \\ C & ------ \quad C \\ | & | \\ O & O \\ | & | \\ A & (B)_n \end{array} \right]_X \quad (I)$$

wherein n may be 1 or 0, and, when n=1, X may be=1 and in this case:

$Z_1$ and $Z_2$ form with each other a $$\begin{array}{c} C_6H_4 \\ | \quad \diagdown \\ | \quad \diagup \\ C_6H_4 \end{array}$$

group
A and B are $$\begin{array}{c} R_1 \\ | \\ A \text{ and B are } -Si-R_2 \\ | \\ R_3 \end{array}$$

groups
wherein $R_1, R_2, R_3$, which may be the same or different, may be $C_1$-$C_4$ alkyl radicals or $C_6$-$C_{12}$ aryl radicals, or X may range from 3 to 20 and in this case:

$Z_1, Z_2$ are aryl radicals, which may be the same or different, $$\begin{array}{c} R_1 \\ | \\ A \text{ and B are } -Si- \text{ groups} \\ | \\ R_2 \end{array}$$

being part of an oligomer of the product having formula (I), consisting at least of 3 and up to 20 repeating units having the formula:

$$\left[ \begin{array}{ccc} R_1 & Ar & A_2 \\ | & | & | \\ -Si-O-C-C- & & -O- \\ | & | & | \\ R_2 & A_2 & Ar \end{array} \right] ; \quad (II)$$

wherein Ar is an aryl radical and $R_1$ and $R_2$ have the meanings as defined hereinbefore;

when, on the contrary, n=0, X is=1

$Z_1, Z_2$ are aryl radicals, which may be the same or different,

A=a group having formula $$\diagdown \quad \diagup$$
$$Si$$
$$\diagup \quad \diagdown$$
$$R_1 \quad R_2$$

or the group having the formula:

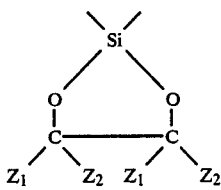

wherein every silicon link is bound to an oxygen atom of the group

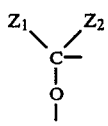

and $R_1$, $R_2$ have the meanings as defined hereinbefore.

2. Compositions according to claim 1 wherein the compound, which is a derivative of benzopinacol, is employed in amounts ranging from 0.01 to 3% by weight referred to the polymer.

3. Compositions according to claim 1 or 2, wherein the antioxidant agents are in amounts up to 2% by weight referred to the polymer.

4. Compositions according to claim 1 or 2, wherein the benzopinacol derivative is an oligomer having 3–20 repeating units having formula:

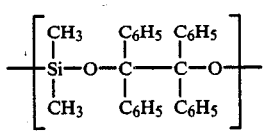

5. Compositions according to claim 1 or 2, wherein the pinacol derivative has the following formula:

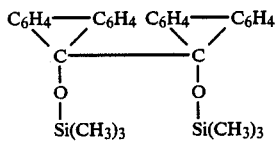

6. Compositions according to claim 1 or 2, wherein the pinacol derivative has the following formula:

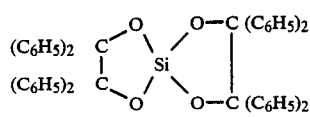

7. Compositions according to claim 1 or 2, wherein the polymer is polypropylene consisting prevailingly of isotactic macromolecules.

8. Compositions according to claim 1 or 2, wherein the polymer is a crystalline copolymer of propylene with ethylene containing a predominant quantity of propylene.

9. A process for carrying out the thermodegradation of crystalline homo- or (co)polymers of propylene consisting in heating such homo- or (co)polymer at a temperature ranging from 250° to 350° C., in the presence of primary and/or secondary antioxidants and of at least one compound having formula:

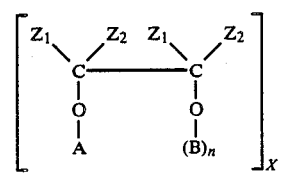

wherein n may be 1 or 0, therefore, when n=1, X may be=1 and in this case:

$Z_1$ and $Z_2$ form with each other a

group

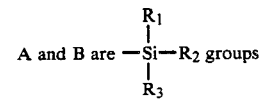

wherein $R_1$, $R_2$, $R_3$, which may be the same or different, may be $C_1$-$C_4$ alkyl radicals or $C_6$-$C_{12}$ aryl radicals, or X may range from 3 to 20 and in this case:

$Z_1$, $Z_2$ are aryl radicals, which may be the same or different

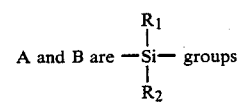

being part of an oligomer of the product having formula (I) consisting of at least 3 and up to 20 repeating units having formula:

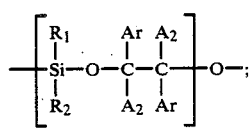

wherein Ar is an aryl radical and $R_1$ and $R_2$ have the meanings as defined hereinbefore;

when, on the contrary, n=0, X is=1

$Z_1$, $Z_2$ are aryl radicals, which may be the same or different,

A=a group having formula:

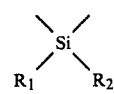

or a group having the formula:

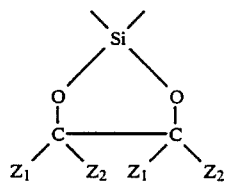

wherein every silicon link is bound to an oxygen atom of the group:

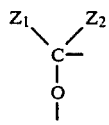

and R₁, R₂ have the meaning as defined above.

10. A process according to claim 9, wherein such temperature ranges from 270° to 330° C.

11. A process according to claim 9 or 10, wherein such compound is an oligomer having 3 to 20 repeating units of the formula:

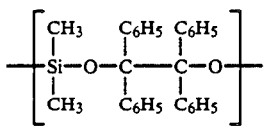

12. A process according to claim 9 or 10, wherein such compound has the following formula:

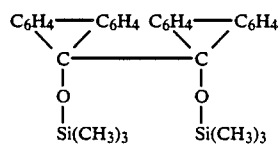

13. A process according to claim 9 or 10, wherein such compound has the following formula:

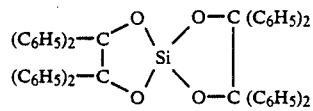

14. A process according to claim 9 or 10, wherein the polymer is polypropylene consisting prevailingly of isotactic macromolecules.

15. A process according to claim 9 or 10, wherein the polymer is a copolymer of propylene with ethylene containing predominantly propylene.

16. A process according to claim 9 or 10, wherein such compound is used in amounts ranging from 0.01 and 3% by weight referred to the polymer.

17. Crystalline homo- and copolymers of propylene obtained by the process according to claim 9 or 10.

* * * * *